(12) United States Patent
Blum

(10) Patent No.: US 9,665,814 B2
(45) Date of Patent: May 30, 2017

(54) MULTI-LAYER METAL-CARBON TRANSACTION CARDS AND ASSOCIATED METHODS

(71) Applicant: Black Card LLC, Jackson, WY (US)

(72) Inventor: Scott Alan Blum, Jackson, WY (US)

(73) Assignee: Black Card LLC, Jackson, WY (US)

( * ) Notice: Subject to any disclaimer, the term of this patent is extended or adjusted under 35 U.S.C. 154(b) by 0 days.

(21) Appl. No.: 13/830,604

(22) Filed: Mar. 14, 2013

(65) Prior Publication Data
US 2013/0320095 A1    Dec. 5, 2013

Related U.S. Application Data

(60) Provisional application No. 61/653,260, filed on May 30, 2012.

(51) Int. Cl.
*G06K 19/02* (2006.01)
*B42D 25/44* (2014.01)
(Continued)

(52) U.S. Cl.
CPC .............. *G06K 19/02* (2013.01); *B32B 15/14* (2013.01); *B42D 25/44* (2014.10); *B42D 25/445* (2014.10);
(Continued)

(58) Field of Classification Search
CPC ....... G06K 19/07722; G06K 19/07728; G06K 19/02; G06K 19/022; B42D 25/00; B42D 25/23; B42D 25/285; B42D 2033/00; B42D 2033/06; B42D 2033/08; B42D 2033/10; B42D 25/45; B42D 25/455; B42D 25/46; B42D 25/47; B42D 25/20; B42D 25/22; G42D 2033/32; B32B 15/14; B32B 15/18; B32B 15/20; B32B 2250/02; B32B 2250/03; B32B 2262/106; B32B 2425/00; C23C 16/26; C23C 16/27; H05K 1/036; H05K 1/0366; Y10T 428/30; Y10T 428/249928; Y10T 428/24994; Y10T 428/249945; B29C 70/06; B29C 66/72321; B29C 66/72323
(Continued)

(56) References Cited

U.S. PATENT DOCUMENTS 4,547,002 A     10/1985  Colgate, Jr.
5,578,415 A  *  11/1996  Hayashi et al. ......... 430/270.11
(Continued)

FOREIGN PATENT DOCUMENTS

CN     302579200 S     9/2013
CN     103854050       6/2014
(Continued)

OTHER PUBLICATIONS

International Search Report from Korean Intellectual Property Office dated Feb. 7, 2014 for relating International Application No. PCT/US2013/067335.
(Continued)

*Primary Examiner* — Suezu Ellis
(74) *Attorney, Agent, or Firm* — Klein, O'Neill & Singh, LLP

(57) ABSTRACT

A transaction card having a first layer and a second layer, wherein the first layer is metal and the second layer is carbon.

10 Claims, 4 Drawing Sheets

(51) Int. Cl.
*B42D 25/445* (2014.01)
*B42D 25/45* (2014.01)
*B32B 15/14* (2006.01)
*G06K 19/077* (2006.01)

(52) U.S. Cl.
CPC .......... *B42D 25/45* (2014.10); *G06K 19/022* (2013.01); *G06K 19/07722* (2013.01)

(58) Field of Classification Search
USPC ............... 235/487, 488, 492, 493, 379, 380; 428/408, 539.5, 545; 427/249.7; 340/5.4, 5.41
See application file for complete search history.

(56) References Cited

U.S. PATENT DOCUMENTS

| | | | |
|---|---|---|---|
| 5,856,662 A * | 1/1999 | Kohama et al. | 235/492 |
| 5,879,775 A * | 3/1999 | Walter et al. | 428/76 |
| D438,563 S | 3/2001 | Webb et al. | |
| 6,561,657 B1 | 5/2003 | Schofield | |
| D505,450 S | 5/2005 | Lauer et al. | |
| D561,628 S | 2/2008 | Cherneff et al. | |
| D574,281 S | 8/2008 | Cherneff et al. | |
| D632,735 S | 2/2011 | McGrane et al. | |
| D642,614 S | 8/2011 | Ahmad et al. | |
| D647,097 S | 10/2011 | Tung et al. | |
| D650,438 S | 12/2011 | Albrecht et al. | |
| D656,542 S | 3/2012 | Ahmad et al. | |
| D665,851 S | 8/2012 | Davis | |
| D680,168 S | 4/2013 | Ahmad et al. | |
| D680,169 S | 4/2013 | Ahmad et al. | |
| 8,434,675 B2 * | 5/2013 | Faith | 235/375 |
| 8,485,447 B1 * | 7/2013 | Pyhrr et al. | 235/492 |
| D693,998 S | 11/2013 | Villanova | |
| 8,640,948 B2 | 2/2014 | Blum | |
| 8,672,232 B2 * | 3/2014 | Herslow | 235/492 |
| 8,725,589 B1 | 5/2014 | Skelding et al. | |
| 9,390,363 B1 | 7/2016 | Herslow et al. | |
| 9,440,481 B1 * | 9/2016 | Thomson | B42D 25/20 |
| 9,466,019 B2 * | 10/2016 | Blum | G06K 19/07722 |
| 2004/0217178 A1 * | 11/2004 | Lasch et al. | 235/488 |
| 2004/0224590 A1 * | 11/2004 | Rawa | B29C 70/088 442/176 |
| 2005/0023359 A1 | 2/2005 | Saunders | |
| 2005/0168339 A1 * | 8/2005 | Arai | G06K 19/07722 340/572.8 |
| 2005/0259326 A1 | 11/2005 | Weber et al. | |
| 2006/0102729 A1 | 5/2006 | Gandel et al. | |
| 2006/0121502 A1 * | 6/2006 | Cain | G01N 33/54373 435/6.19 |
| 2007/0026205 A1 * | 2/2007 | Anton | B05D 5/06 428/195.1 |
| 2008/0245865 A1 * | 10/2008 | Mosteller | 235/449 |
| 2009/0078776 A1 | 3/2009 | Blum | |
| 2009/0115185 A1 | 5/2009 | Hoffmuller et al. | |
| 2012/0325914 A1 | 12/2012 | Herslow | |
| 2013/0206320 A1 * | 8/2013 | Mungas et al. | 156/89.26 |
| 2013/0320095 A1 | 12/2013 | Blum | |
| 2014/0158773 A1 | 6/2014 | Blum | |
| 2014/0174645 A1 * | 6/2014 | Segura et al. | 156/247 |
| 2015/0339564 A1 | 11/2015 | Herslow et al. | |

FOREIGN PATENT DOCUMENTS

| | | |
|---|---|---|
| EP | 0330726 | 2/1995 |
| HK | 1300776.0M002 | 5/2013 |
| JP | 61-162386 | 7/1986 |
| JP | H2-41976 | 3/1990 |
| JP | H0648075 | 2/1994 |
| JP | H07285197 | 10/1995 |
| WO | WO2009/042786 | 4/2009 |
| WO | WO 2009042786 A2 * | 4/2009 |
| WO | WO2014/088729 | 6/2014 |

OTHER PUBLICATIONS

Written Opinion of the International Searching Authority from Korean Intellectual Property Office dated Feb. 7, 2014 for relating International Application No. PCT/US2013/067335.
Office Action from USPTO dated Mar. 22, 2016 for U.S. Appl. No. 15/052,706.
Final Office Action from USPTO dated Jun. 5, 2015 for U.S. Appl. No. 13/830,636.
Office Action from USPTO dated Jun. 25, 2015 for U.S. Appl. No. 29/439,117.
Office Action from USPTO dated Oct. 1, 2015 for U.S. Appl. No. 13/830,636.
Extended European Search Report from European Patent Office dated Jul. 5, 2016 for related European Application No. EP13860285.9.
Final Office Action from USPTO dated Nov. 9, 2016 for U.S. Appl. No. 15/052,706.

* cited by examiner

MULTI-LAYER METAL-CARBON TRANSACTION CARDS AND ASSOCIATED METHODS

CROSS-REFERENCE TO RELATED APPLICATION

This application claims priority to provisional application Ser. No. 61/653,260, filed on May 30, 2012, the entire contents of which are hereby incorporated by reference.

BACKGROUND

The present embodiments relate to transaction cards, such as credit cards and debit cards, that are used as substitutes for cash.

DESCRIPTION OF RELATED ART

The vast majority of transaction cards in use today are constructed of plastic. These cards tend to be flimsy and wear out or break easily.

SUMMARY

The preferred embodiments of the present transaction card have several features, no single one of which is solely responsible for their desirable attributes. Without limiting the scope of the present embodiments as expressed by the claims that follow, their more prominent features will now be discussed briefly. After considering this discussion, and particularly after reading the section entitled "Detailed Description of the Preferred Embodiments," one will understand how the features of the present embodiments provide advantages, which include increased strength and durability, greater rigidity, decreased weight, longer lifespan, enhanced feel and high tech look.

One embodiment of the present transaction card comprises a substantially planar sheet having a front surface, a back surface and a continuous peripheral edge. The planar sheet includes a first layer and a second layer. The first layer is metal and the second layer is carbon.

Another of the present embodiments comprises a process of making a transaction card. The method comprises printing a back surface of a planar carbon sheet with text, coating a sheet of stainless steel with a black coating, adhering the printed carbon sheet to the coated stainless steel sheet, and hot stamping a signature panel, a magnetic strip, and a hologram onto a back surface of the card.

BRIEF DESCRIPTION OF THE DRAWINGS

The preferred embodiments of the present transaction card will now be discussed in detail with an emphasis on highlighting the advantageous features. These embodiments depict the novel and non-obvious transaction card shown in the accompanying drawings, which are for illustrative purposes only. These drawings include the following figures, in which like numerals indicate like parts.

DETAILED DESCRIPTION OF THE PREFERRED EMBODIMENTS

Figure 1:
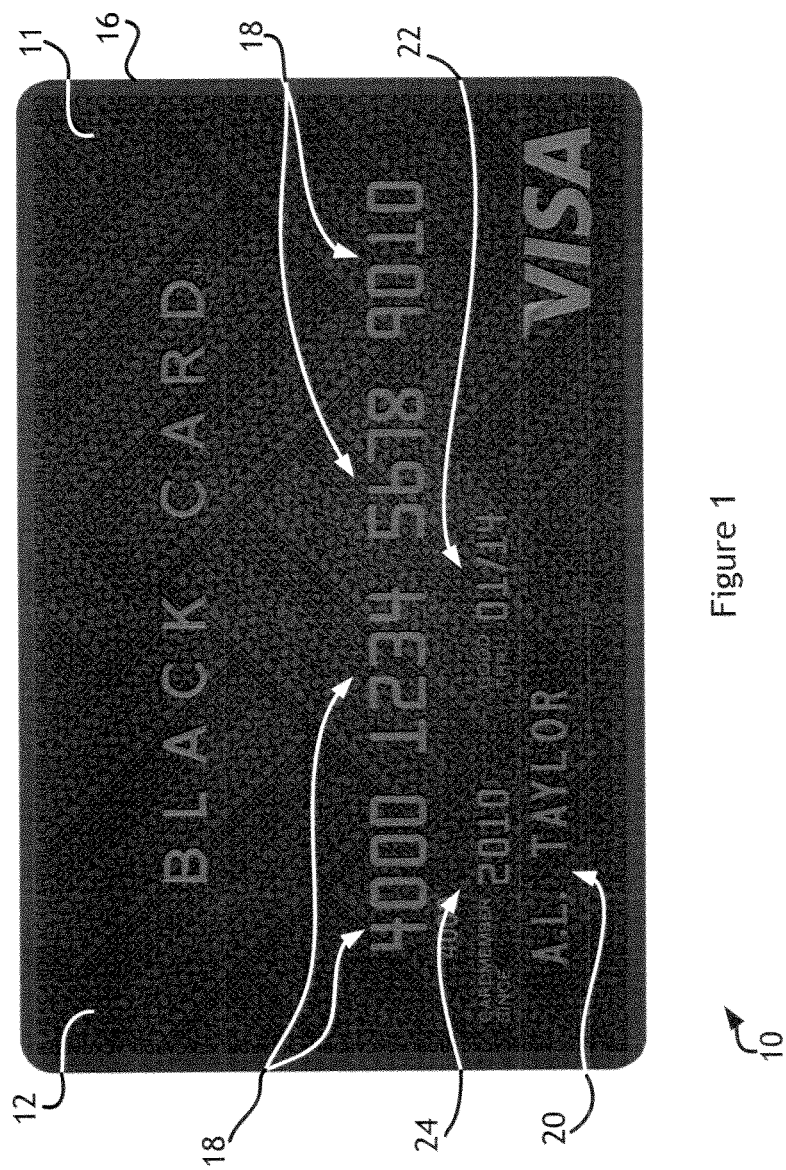
FIG. 1 is a front elevation view of one embodiment of the present transact card.
Figure 2:
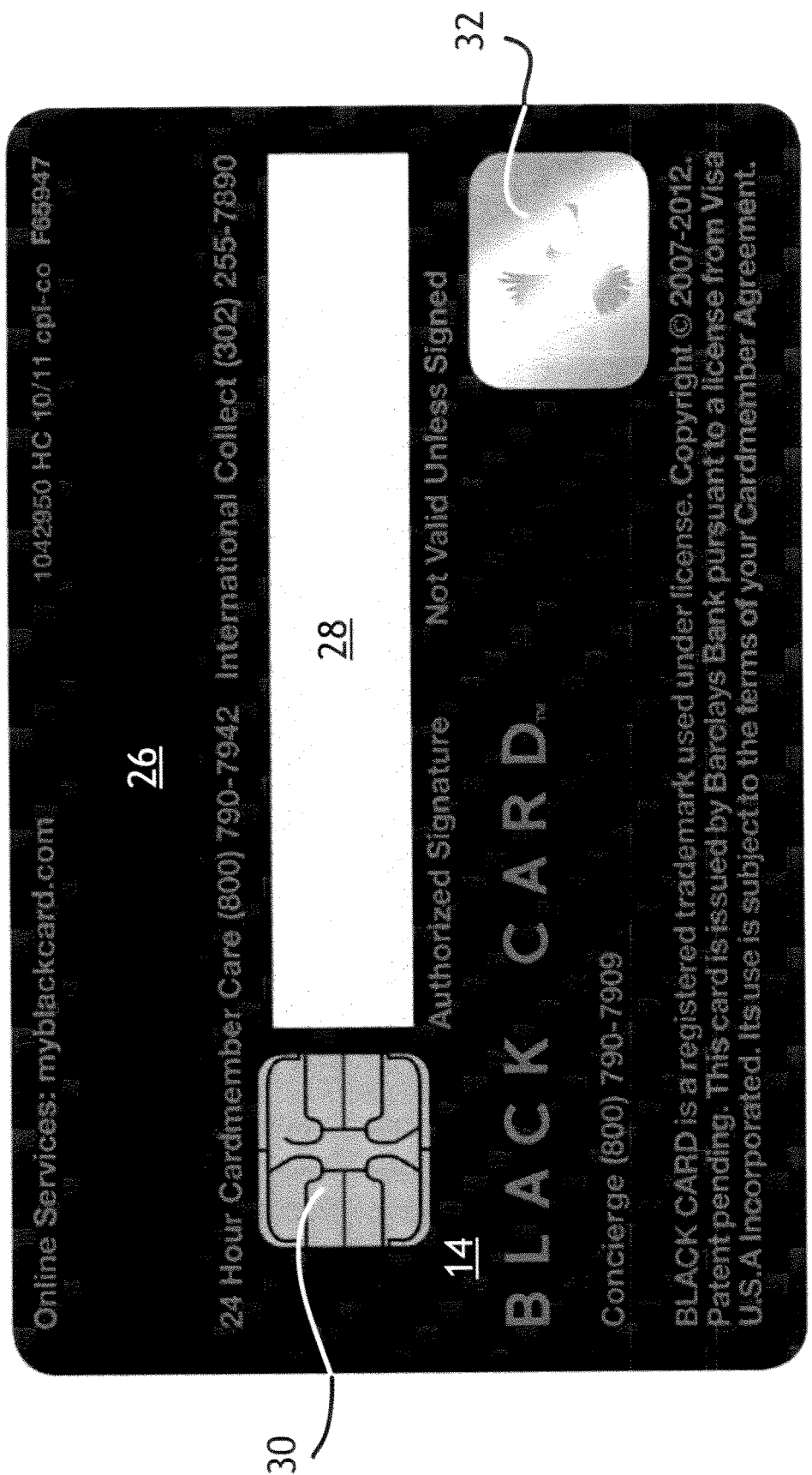
FIG. 2 is a rear elevation view of the transaction card of FIG. 1.

With reference to FIGS. 1 and 2, the present transaction card 10 is a substantially planar sheet 11 having a front surface 12 and a back surface 14. The card 10 includes a continuous peripheral edge 16, which in the illustrated embodiment is substantially rectangular. However, those of ordinary skill in the art will appreciate that the card 10 could have virtually any shape, such as square, round or hexagonal. The scope of the present card 10 is not limited to any particular shape.

In the illustrated embodiment, the transaction card 10 bears a number 18 (FIG. 1) that identifies the card 10 as being associated with a particular account. In the illustrated embodiment, the account number 18 has sixteen digits. However, in alternative embodiments the card 10 may have fewer or more digits. The card 10 also bears the name 20 of the card holder and an expiration date 22. In certain embodiments, the card 10 may also bear a year 24 or date on which the card holder first acquired the card 10. The information displayed on the card 10 may be applied in any suitable manner, such as embossing, printing, engraving, etching, etc. The front surface 12 of the card 10 further includes interlocking strips of repeated strings of the words "BLACK CARD" in all caps, giving the front surface 12 a woven fabric appearance.

With reference to FIG. 2, the back surface 14 of the present transaction card 10 includes a magnetic strip 26. The magnetic strip 26 stores information that is readable by a magnetic reader. For example, the magnetic strip 26 may contain a series of digits from which the magnetic card reader can obtain information about the account associated with the card 10 and/or the card holder. The back surface 14 of the present transaction card 10 further includes a signature panel 28.

The present transaction card 10 further includes an embedded chip 30, such as a radio-frequency identification (RFID) chip or an EMV (Europay, MasterCard and VISA) chip 30. RFID is a wireless non-contact system that uses radio-frequency electromagnetic fields to transfer data from the chip 30 to a receiver for the purposes of automatic identification and tracking. EMV is a global standard for inter-operation of integrated circuit cards (IC cards or "chip cards") and IC card capable point of sale (POS) terminals and automated teller machines (ATMs), for authenticating credit and debit card transactions. The card 10 further includes a holographic image 32, which is useful to discourage counterfeiting. While not shown, the card 10 may further include one or more transparent portions. Such transparent portions may include one or more optically recognizable layers or infrared-blocking ink to allow the transparent portion(s) to be recognized by an optical card reader. These additional features may allow the transaction card 10 to function more easily, efficiently, and/or more securely.

Figure 3:
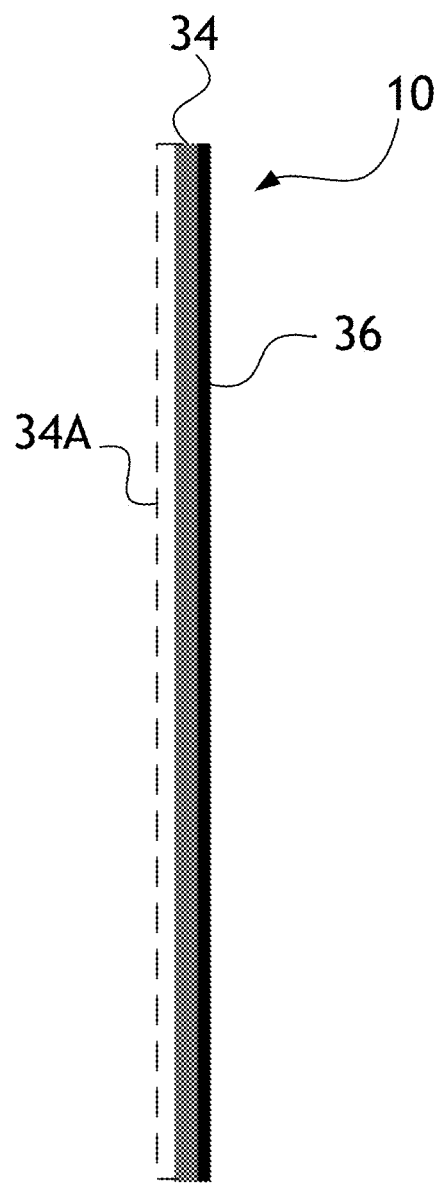
FIG. 3 is a side elevation view of the transaction card of FIG. 1.
Figure 4:
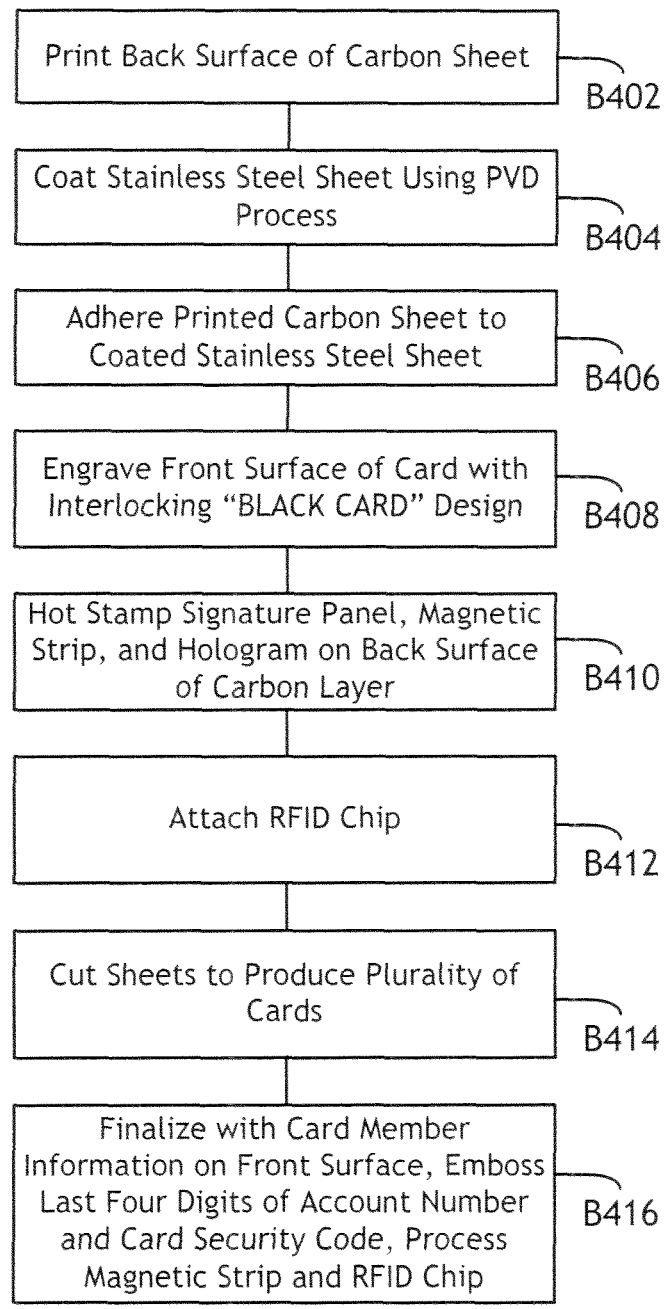
FIG. 4 is a flowchart illustrating a process for making transaction cards, according to the present embodiments.

With reference to FIG. 3, the planar sheet 11 is constructed of a front layer 34 and a back layer 36. In the illustrated embodiment, the front layer 34 is a metal, such as stainless steel, and the back layer 36 is carbon. The front layer 34 could comprise a different metal such as nickel-silver, or any other metal or alloy. The front and back layers 34, 36 may, for example, be adhered to one another with an adhesive or secured in any other manner.

The carbon layer 36 may be in any of a variety of forms, such as carbon graphite and/or carbon fiber. In carbon fiber embodiments the carbon layer 36 may comprise a woven carbon fabric. In certain embodiments the carbon layer 36 may be entirely carbon. The percentage of carbon and/or carbon graphite in the carbon layer 36 may vary and may be up to 100%. However, the adaptive embodiments are not limited to any particular ratio or percentage of carbon/carbon graphite or the type and form of carbon.

In the illustrated embodiment, the front layer 34 may be about 0.02" thick, and the back layer 36 may be about 0.013" thick, for an overall thickness of 0.033" for the card 10. In another embodiment, the front layer 34 may be about 0.02" thick, and the back layer 36 may be about 0.007" thick, for an overall thickness of 0.027" for the card 10. In still other embodiments, the overall card thickness may be in the range of 0.0315"-0.032". However, the foregoing dimensions are not limiting, as the card 10 and/or its layers 34, 36 could have any thickness.

In some embodiments the front layer 34 may include a coating, such as a physical vapor deposition (PVD) coating (34A, FIG. 3). The PVD coating may be, for example, black in color so that the metal layer 34 matches the natural black color of the carbon layer 36. In certain other embodiments the card 10 may include additional layers, with at least one of the layers being one or more polymeric materials. For example, outer layers of the card 10 may be polymeric while inner layers of the card 10 are carbon, or metal, or vice versa.

The vast majority of today's transaction cards are constructed of plastic. The present transaction card 10 is advantageously stronger and more durable than such plastic cards. It is also more rigid, lighter, and has a longer lifespan. In addition to these benefits, the carbon/metal combination provides the card 10 with a unique feel and high tech look. The card 10 is thus more desirable for its distinctiveness over a typical plastic card.

A process of making the present card 10 may comprise printing a back surface of a planar carbon sheet with text, as shown at block B402. The text may include the text shown in FIG. 2, and/or an Internet address with information relating to the card 10, and/or one or more customer service phone numbers, and/or other text. The printing may be carried out on a sheet of the carbon layer 36 that will eventually be cut in a grid pattern to separate a plurality of cards 10 from one another.

The process further comprises coating a sheet of stainless steel with a black coating using a PVD process, as shown at block B404. Again, the coating (34A, FIG. 3) may be carried out on a sheet of the metal layer 34 that will eventually be cut in a grid pattern to separate a plurality of cards 10 from one another. In alternative embodiments, the sheet may be a metal other than stainless steel, and the coating process may be a process other than PVD, such as diamond-like carbon (DLC) application process. Further, in alternative embodiments the coating may be a color other than black.

The process further comprises adhering the printed carbon sheet to the coated stainless steel sheet, as shown at block B406. The front surface 12 of the card 10 is then etched with the interlocking "BLACK CARD" design, shown in FIG. 1, as shown at block B408. In alternative embodiments, the "BLACK CARD" design may be applied with a process other than etching, such as engraving. The larger "BLACK CARD" logo may also be etched/engraved.

The process further comprises hot stamping the signature panel, magnetic strip, and hologram onto the back surface of the card 10, and attaching the RFID chip, as shown at blocks B410 and B412, respectively. The sheets are then cut to produce a plurality of cards 10, as shown at block B414. In one embodiment, the metal and carbon sheets may measure 19.875"×25.20", and when cut each card 10 measures 3.370"×2.125". Each card 10 is then finalized with the card member information on the front surface 10, embossed with the last four digits of the account number and the card security code on the signature panel, and the magnetic strip and RFID chip are processed, as shown at block B416.

The above description presents the best mode contemplated for carrying out the present transaction card, and of the manner and process of making and using it, in such full, clear, concise, and exact terms as to enable any person skilled in the art to which it pertains to make and use this transaction card. This transaction card is, however, susceptible to modifications and alternate constructions from that discussed above that are fully equivalent. Consequently, this transaction card is not limited to the particular embodiments disclosed. On the contrary, this transaction card covers all modifications and alternate constructions coming within the spirit and scope of the transaction card as generally expressed by the following claims, which particularly point out and distinctly claim the subject matter of the transaction card.

What is claimed is:

1. A transaction card, comprising:
   a substantially planar sheet having a front surface, a back surface and a continuous peripheral edge;
   wherein the planar sheet includes a first metal layer of stainless steel coated with a diamond-like carbon coating with etched interlocking strips of repeated strings of text throughout the front surface providing a woven fabric appearance to the entire front surface and a second layer adhered directly adjacent the first layer, the second layer comprising a woven carbon fiber layer at the back surface; and
   wherein a first metal layer thickness is greater than a thickness of the second layer of woven carbon fiber.

2. The transaction card of claim 1 wherein the substantially planar sheet includes a transparent portion.

3. The transaction card of claim 2 wherein the transparent portion includes an optically recognizable layer.

4. The transaction card of claim 2 wherein the transparent portion includes an infrared-blocking ink.

5. A method of making a transaction card, the method comprising:
   printing a back surface of a first sheet with text, the first sheet comprising woven carbon fiber;
   coating a second sheet with a diamond-like carbon coating, the second sheet comprising stainless steel;
   etching interlocking strips of repeated strings of text across the second sheet to provide a woven fabric appearance to an entire front surface;
   adhering the first sheet directly adjacent to the second sheet with the front surface of the second sheet facing away from the first sheet; and
   hot stamping a signature panel, a magnetic strip, and a hologram onto a back surface of the transaction card.

6. The method of claim 5, further comprising applying a design to a front surface of the transaction card.

7. The method of claim 6, wherein the interlocking text comprises recitations of "BLACK CARD".

8. The method of claim 6, wherein applying the design comprises etching.

9. The method of claim 6, wherein applying the design comprises engraving.

10. The method of claim 5, further comprising attaching a radio frequency identification (RFID) chip to the transaction card.

\* \* \* \* \*